(12) United States Patent
Hatano et al.

(10) Patent No.: US 7,973,243 B2
(45) Date of Patent: Jul. 5, 2011

(54) COIL INSULATOR, ARMATURE COIL INSULATED BY THE COIL INSULATOR AND ELECTRICAL ROTATING MACHINE HAVING THE ARMATURE COIL

(75) Inventors: Hiroshi Hatano, Chofu (JP); Katsuhiko Yoshida, Yokohama (JP); Toshimitsu Yamada, Yokohama (JP); Shinobu Sekito, Yokohama (JP); Susumu Nagano, Kawasaki (JP); Hiroyoshi Tsuchiya, Kitakyushu (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 651 days.

(21) Appl. No.: 12/043,100

(22) Filed: Mar. 5, 2008

(65) Prior Publication Data

US 2009/0072654 A1    Mar. 19, 2009

(30) Foreign Application Priority Data

Mar. 6, 2007    (JP) ................. 2007-056181

(51) Int. Cl.
*H01B 17/00* (2006.01)
(52) U.S. Cl. .................................. 174/137 R
(58) Field of Classification Search .............. 174/120 R, 174/137 R
See application file for complete search history.

(56) References Cited

U.S. PATENT DOCUMENTS

| | | | |
|---|---|---|---|
| 4,806,806 A * | 2/1989 | Hjortsberg et al. ............. 310/45 |
| 6,288,341 B1 * | 9/2001 | Tsunoda et al. .......... 174/137 B |
| 2002/0056569 A1 | 5/2002 | Tsunoda | |
| 2005/0277349 A1 | 12/2005 | Smith | |

FOREIGN PATENT DOCUMENTS

| | | |
|---|---|---|
| EP | 0 266 602 A1 | 5/1988 |
| EP | 1 486 997 A1 | 12/2004 |
| JP | 55-53802 A | 4/1980 |
| JP | 63-110929 A | 5/1988 |
| JP | 6-48839 A | 2/1994 |
| JP | 10-174333 A | 6/1998 |
| JP | 2000-58314 A | 2/2000 |
| JP | 2000-149662 A | 5/2000 |
| JP | 2001-172604 A | 6/2001 |

(Continued)

OTHER PUBLICATIONS

European Patent Office Search Report dated Jul. 15, 2008, issued in corresponding European Application No. 08152229.4, filed Apr. 3, 2008.

(Continued)

*Primary Examiner* — Chau N Nguyen
(74) *Attorney, Agent, or Firm* — Christensen O'Connor Johnson Kindness PLLC

(57) ABSTRACT

A coil insulator of an electrical rotating machine used as a main insulator for insulating a bundle of conductors formed of a plurality of insulated wires to form an armature coil provided in a slot of a rotor core or a stator core of an electrical rotating machine, wherein the coil insulator includes a mica layer including at least one of a peeled-off mica and a composite mica, a woven- or unwoven cloth including at least one of inorganic and organic materials, hexagonal crystal boron nitride particles having a graphitization index of 1.8 or more, and thermosetting polymer organic resin which integrally connects the mica layer and the hexagonal crystal boron nitride particles to each other, and the hexagonal crystal boron nitride particles is oriented in a longitudinal direction of the coil.

12 Claims, 6 Drawing Sheets

FOREIGN PATENT DOCUMENTS

JP 2006-262559 A 9/2006
RU 2 266 865 C1 12/2005

OTHER PUBLICATIONS

English translation of Japanese Office Action mailed Jul. 7, 2009, issued in corresponding Japanese Application No. 2007-056181.

Funahashi, T., "Development and Application of High-Purity Hexagonal Boron Nitride (h-BN) Powder," Kawasaki Steel Corporation Technique, vol. 24(2), Feb. 1992.

Japanese Notice of Reasons for Rejection mailed Apr. 12, 2011, issued in corresponding Japanese Application No. 2007-056181, filed Mar. 6, 2007, 9 pages.

* cited by examiner

| Item | Unit | Value of characteristics |
|---|---|---|
| Weight of mica | g/m² | 160 |
| Weight of glass cloth | g/m² | 25 |
| Thickness of glass cloth | mm | 0.030 |
| Weight of adhesive | g/m² | 25 |
| Weight of hexagonal crystal boron nitride | g/m² | 55 |
| Weight of mica tape | g/m² | 265 |
| Width of mica tape | mm | 30 |
| Thickness of mica tape | mm | 0.20 |

FIG. 7

COIL INSULATOR, ARMATURE COIL INSULATED BY THE COIL INSULATOR AND ELECTRICAL ROTATING MACHINE HAVING THE ARMATURE COIL

CROSS-REFERENCE TO RELATED APPLICATIONS

This application is based upon and claims the benefit of priority from prior Japanese Patent Application No. 2007-056181, filed Mar. 6, 2007, the entire contents of which are incorporated herein by reference.

BACKGROUND OF THE INVENTION

1. Field of the Invention

The present invention relates to a coil insulator, an armature coil insulated by the coil insulator and an electrical rotating machine having the armature coil, in which hexagonal crystal boron nitride particles having graphitization index of 1.8 or higher are integrated in a mica layer forming a mica tape, the particles being oriented along a longitudinal direction of the armature coil or along a laminating direction of the mica tape.

2. Description of the Related Art

An insulator including mica and thermosetting polymer organic resin as a main component is applied to an armature coil of a large-scale or high voltage electrical rotating machine in many cases. However, the organic resin having inferior heat resistance as compared with metal or ceramic is used as a main constituent material of the insulator, and the insulator is heat-deteriorated by rise of coil temperature by Joule loss during operation of the electrical rotating machine. Thus, various cooling systems for an armature coil are employed in the electrical rotating machine, especially in a large-scale power generator to suppress the heat-deterioration.

The cooling systems are roughly categorized into two kinds, i.e., a direct cooling system in which a conductive body has a hollow structure, water or hydrogen is circulated in the hollow structure and a coil is directly cooled, and an indirect cooling system in which Joule heat generated in the coil conductive body is radiated to an iron core through a coil insulator in addition to a cooling of the iron core by hydrogen or air circulated in the iron core.

Recently, an inexpensive indirect cooling system having a simple structure and excellent maintenance performance has become a focus of attention, and the electrical rotating machine has been increased in capacity by this indirect cooling system.

According to the indirect cooling system, however, since Joule heat is radiated through a coil insulator, the radiation is hindered by the insulator having inferior thermal conductivity as compared with metal or ceramic, and cooling ability is often inferior as compared with the direct cooling system. Hence, a technique for improving the thermal conductivity of the insulator is disclosed in Jpn. Pat. Appln. KOKAI Publication No. 63-110929 as one example.

FIG. 11 is a diagram for explaining a structure of one example of a conventional coil insulator 110. The coil insulator 110 is formed by winding a plurality of times a mica tape around a coil conductor of an armature coil of an electrical rotating machine (not shown). The armature coil is fixed in a coil slot formed in a stator of the electrical rotating machine, for example.

As shown in FIG. 11, the coil insulator 110 is formed by laminating a plurality of (three, in this case) mica layers 112 each having small mica scales or peeled-off mica flakes 111. Thermosetting resins are impregnated in each of the three mica layers 112 and spaces 113 formed among the mica layers 112, and they are integrally formed as a whole to form the conventional coil insulator 110.

The conventional coil insulator 110 shown in FIG. 11 further includes insulative filler particles 114 having particles diameter of 0.1 µm to 15 µm disposed in the spaces 113 among the mica layers 112. The particless 114 have high thermal conductivity. With this, the impregnated resin layer portion has a specific heat conductivity of at least 5 W/mK.

Here, hexagonal crystal boron nitride particles is used as filler having thermal conductivity of 5 W/mK or more. In this case, this particles material is scaly in shape and has anisotropy in the thermal conductivity, and the thermal conductivity along the crystallographic Z-axis is low. Thus, in terms of improvement in thermal conductivity, it is preferable that the Z-axis of the boron nitride crystal is vertical with respect to the laminating direction of the mica layer 112, i.e., the Z-axis is oriented in a width direction passing through the laminated layer with respect to the laminating direction of the mica layer 112.

Since this material is of scaly in shape, it is preferable that the laminating direction of the mica layer 112 and the Z-axis of the crystal are parallel to each other, i.e., the Z-axis is oriented in parallel with respect to the laminating direction of the mica layer 112 or the longitudinal direction of the coil so that the advancing path length of the electric tree causing the deterioration of the voltage endurance is extended along the longitudinal direction of the laminated mica layer 112. Thus, it is difficult to satisfy both the electric characteristics and thermal conductivity.

Jpn. Pat. Appln. KOKAI Publication No. 55-53802 describes that thermal conductivity of a mica sheet is enhanced when boron nitride particles having particles diameter of 30 µm to 100 µm is mixed in the mica sheet to form an epoxy resin laminated layer, as compared with a product in which boron nitride particles is not mixed. However, when the particles having the particles diameter of 1 µm to 50 µm and mica scales having a size of 0.1 to 1.5 mm are used together to form a mica sheet, the particles is oriented in the same direction as the mica scales in the mica sheet. Thus, when the mica sheet is used as the coil insulation, the hexagonal crystal boron nitride particles is oriented in the laminating direction of the mica sheet or the longitudinal direction of the coil. Namely, it is oriented in a direction in which the thermal conductivity of the boron nitride is low. In this case, although the electric characteristics and thermal conductivity are both improved as compared with a non-boron-nitride-mixed product, there is a room for further improving the thermal conductivity.

BRIEF SUMMARY OF THE INVENTION

In the example of Jpn. Pat. Appln. KOKAI Publication No. 63-110929, although the thermal conductivity is improved by filling a high-thermal-conductivity filler, the thermal conductivity has anisotropy. When hexagonal crystal boron nitride having a scaly shape is used as the filler, a degree of improvement in thermal conductivity of the mica tape is suppressed by the orientation of the boron nitride.

Especially when the mica tape is used as a coil insulator of an electrical rotating machine, it is preferable that the filler is oriented such that the thermal conductivity of the filler becomes small for improving the electrical insulation characteristics and thus, this tendency appears remarkably. Also in terms of production of a high-thermal-conductivity mica tape, since it is applied on a surface of the mica tape by using a brush or a bar coater or by a dripping method, it is easy to orient.

In the example of Jpn. Pat. Appln. KOKAI Publication No. 55-53802, mica piece having the scaly shape and the hexagonal crystal boron nitride having the scaly shape are used to make a mica sheet. Therefore, there is a tendency that it is oriented more and the improvement in the thermal conductivity in the thickness direction of the sheet is suppressed as compared with the case disclosed in Jpn. Pat. Appln. KOKAI Publication No. 63-110929.

In an electrical insulator used in an electrical rotating machine using a hexagonal crystal boron nitride having a crystal structure showing the anisotropy in the thermal conductivity characteristic, there is a case in which improvement in the thermal conductivity of the mica tape is hindered by orientation of the filler material. Thus, it is desired to provide a coil insulator which is oriented to secure the electric characteristics and capable of largely improving thermal conductivity, an armature coil insulated by such a coil insulator, and an electrical rotating machine provided with the armature coil.

One embodiment of the invention provides a coil insulator used as a main insulator for insulating a bundle of conductors formed of a plurality of insulated wires to form an armature coil provided in a slot of a rotor core or a stator core of an electrical rotating machine, wherein the coil insulator comprises: a mica layer including at least one of a peeled-off mica and a composite mica; a woven- or unwoven cloth formed of at least one of inorganic and organic materials; hexagonal crystal boron nitride particles having a graphitization index of 1.8 or higher; and thermosetting polymer organic resin for forming an integrated configuration of the mica layer and the hexagonal crystal boron nitride particles, wherein the hexagonal crystal boron nitride particles is oriented in a longitudinal direction of the armature coil.

Another embodiment of the invention provides a coil insulator used as a main insulator for insulating a bundle of conductors formed of a plurality of insulated wires to form an armature coil provided in a slot of a rotor core or a stator core of an electrical rotating machine, wherein the coil insulator comprises: a resin-applied mica tape including a mica layer containing at least one of a peeled-off mica and a composite mica, a woven- or unwoven cloth formed of at least one of inorganic and organic materials, and polymer organic resin which adheres the mica layer and the cloth to each other to form the resin-applied mica tape; and an organic resin layer containing hexagonal crystal boron nitride particles having a graphitization index of 1.8 or more to at least one of a surface of the resin-applied mica tape opposed to the cloth and an opposed surface of the mica layer, and the resin-applied mica tape is wound around the bundle of the conductors, and then, thermosetting polymer organic resin is impregnated in the mica tape, shaped and hardened.

Still another embodiment of the invention provides a coil insulator used as a main insulator for insulating a bundle of conductors formed of a plurality of insulated wires to form an armature coil provided in a slot of a rotor core or a stator core of an electrical rotating machine, wherein the coil insulator comprises: a mica tape configured of a composite mica paper in which hexagonal crystal boron nitride particles having a graphitization index of 1.8 or more is mixed with mica foil, a woven- or unwoven cloth made of at least one of inorganic and organic materials, and a polymer organic resin to adhere the composite mica paper and the cloth to each other, and wherein the mica tape is wound around the bundle of conductors, impregnated with a thermosetting polymer organic resin and then, hardened.

Another embodiment of the invention provides a coil insulator used as a main insulator for insulating a bundle of conductors formed of a plurality of insulated wires to form an armature coil provided in a slot of a rotor core or a stator core of an electrical rotating machine, wherein the coil insulator comprises: a mica layer including at least one of a peeled-off mica and a composite mica, a woven- or unwoven cloth formed of at least one of inorganic and organic materials, and thermosetting semi-hardened polymer organic resin which adheres the mica layer and the cloth to each other; and wherein the mica tape coated on at least one of a surface opposed to the cloth and a surface opposed to the mica layer with organic resin including hexagonal crystal boron nitride particles having at least a graphitization index of 1.8 or more is wound around the bundle of conductors, shaped under pressure, and hardened under heated condition.

Another embodiment of the invention provides a coil insulator used as a main insulator for insulating a bundle of conductors formed of a plurality of insulated wires to form an armature coil provided in a slot of a rotor core or a stator core of an electrical rotating machine, wherein the coil insulator comprises: a mica tape including a composite mica layer in which hexagonal crystal boron nitride particles having at least a graphitization index of 1.8 or more is mixed, a woven- or unwoven cloth formed of at least one of inorganic and organic materials, and thermosetting semi-hardened polymer organic resin which adheres the composite mica layer and the cloth to each other; and wherein the mica tape is wound around the bundle of conductors, shaped under pressure, and hardened under heated condition.

Another embodiment of the invention provides an armature coil of an electrical rotating machine comprising: a bundle of coil conductors; and a coil insulator coated on the bundle of the coil conductors, wherein the coil insulator has the structure described in any one of claims 1 to 6.

Another embodiment of the invention provides an electrical rotating machine comprising: a rotor; and a stator having an armature coil opposed to the rotor, wherein the armature coil has the structure as shown in claim 7.

In the coil insulator of the electrical rotating machine according to an embodiment of the present invention, a graphitization index of hexagonal crystal boron nitride particles is set to 1.8 or more. With this, the thermal conductivity can further be enhanced even if it is oriented in a longitudinal direction of the insulating layer to secure the electric conductivity.

BRIEF DESCRIPTION OF SEVERAL VIEWS OF THE DRAWINGS

FIG. 6 is a characteristic comparison diagram showing characteristics of coil insulators of a plurality of examples of the invention in comparison with characteristics of a conventional coil insulator;

FIG. 7 is a diagram showing characteristics of an example of a mica tape according to the present invention;

DETAILED DESCRIPTION OF THE INVENTION

Embodiments of the present invention will be explained with reference to FIGS. 1 to 10.

Figure 1:
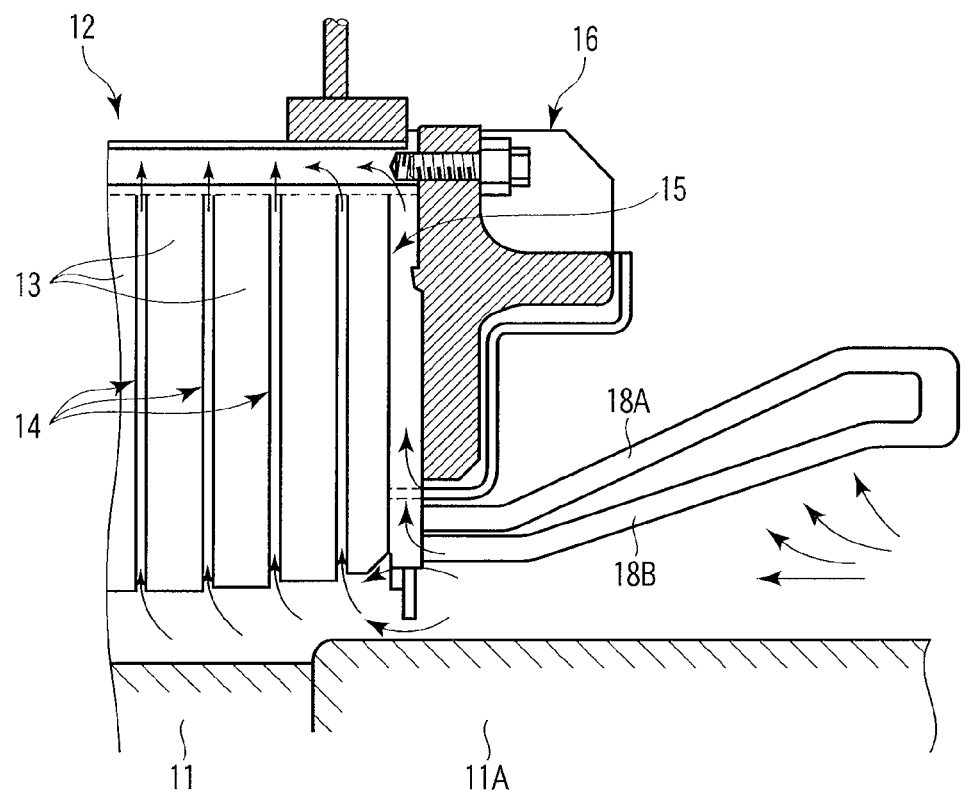
FIG. 1 is a schematic sectional view of a major structure of an embodiment of an electrical rotating machine constituted using a coil insulator according to one aspect of the present invention.

FIG. 1 is a schematic sectional view showing a structure of a power generator which is an electrical rotating machine of an embodiment to which the invention is applied. The power generator includes a rotor 11 which is rotatably held on a bearing (not shown), and a stator 12 disposed around the rotor 11. A plurality of stator cores 13 are arranged side-by-side in an axial direction of the rotor 11, and the stator cores 13 are fixed to the stator 12 through an inner spacer 14. The outer side of the stator core 13 and the inner spacer 14 is held by an outer spacer 15, and the spacer 15 is fixed by a retainer plate 16.

Figure 2:
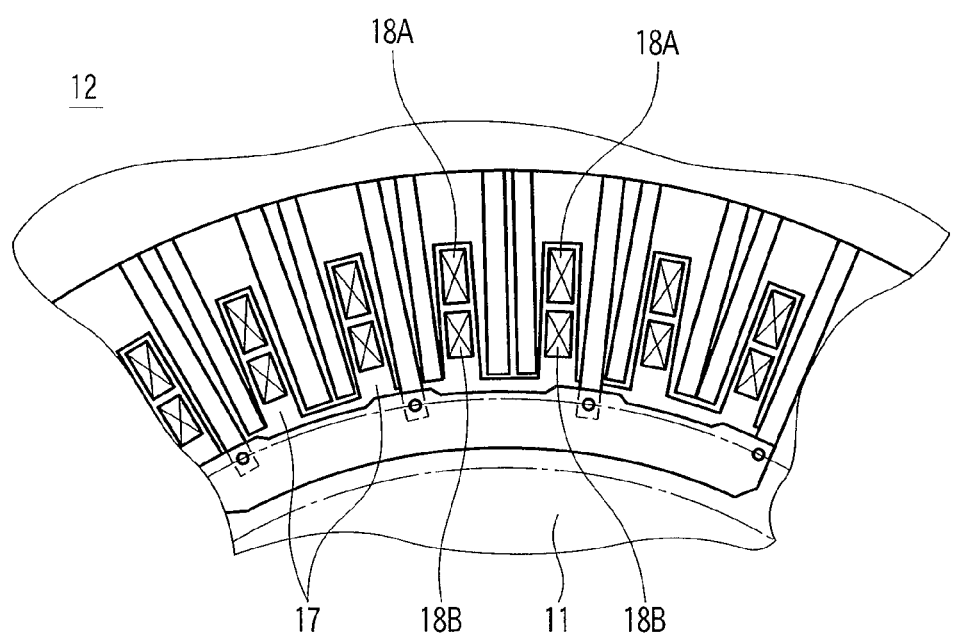
FIG. 2 is a schematic sectional view of an internal structure of a stator of the electrical rotating machine shown in FIG. 1.

As shown in FIG. 2, the stator 12 is formed with a plurality of slots 17 having openings on the side facing the rotor 11. Two armature coils 18A and 18B are disposed in each of the slots 17. The coils 18A and 18B are led outside of the stator cores 13 from the slot 17, and are connected to each other above an end ring 11A mounted on the rotor 11, thereby forming an armature winding. In FIG. 1, a plurality of arrows show flows of cooling gas.

Figure 3:
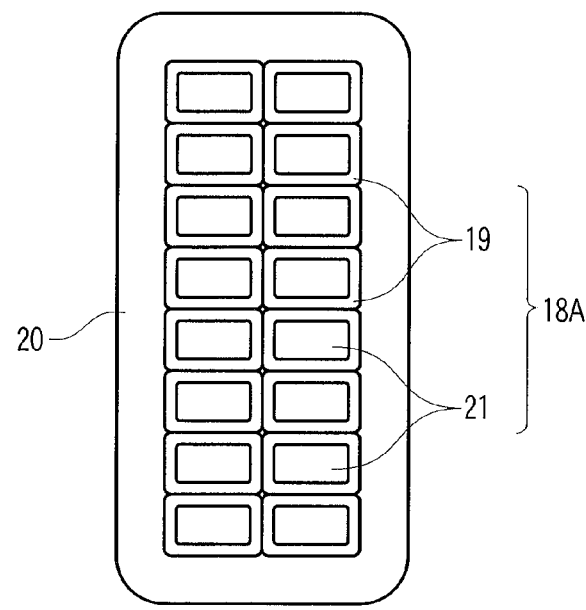
FIG. 3 is a sectional view showing one armature coil of armature coils shown in FIG. 2.

For example, as shown in FIG. 3, the armature coil 18A is formed by binding a plurality of conductors 21 (in this case, 16 conductors) coated with insulating layers 19, and the coil 18A is further integrally coated with a main insulating layer 20. The other coil 18B is formed in the same manner. The main insulating layer 20 is made of a coil insulator of the invention as will be explained later.

Figure 4:
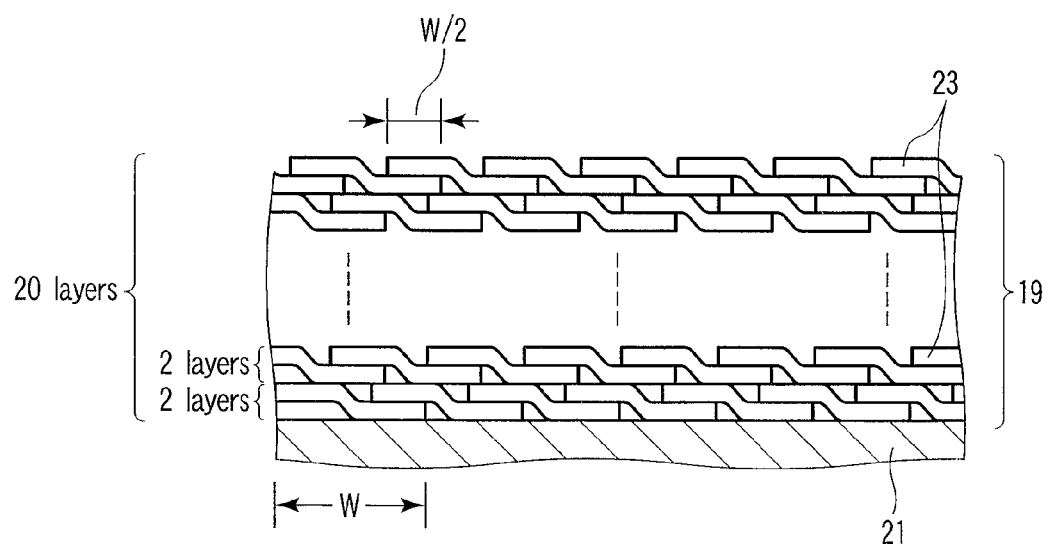
FIG. 4 is a partial sectional view of the coil shown in FIG. 3 in which a mica tape according to an embodiment of the invention is wound around the coil.

As shown in FIG. 4, the main insulating layer 20 is formed of a high-thermal-conductivity mica tape 23 wound around the bundle 19 of a plurality of wire conductors a plurality of times (20 times, i.e., 20 layers, in this case). The mica tape 23 is formed so as to have a predetermined width W. The mica tape 23 is spirally wound such that as the mica tape 23 is wound around the conductor 21 once, the mica tape 23 is superposed on each other by W/2, for example. A thermosetting resin is previously impregnated in the wound mica tape 23, for example, and the 20 layers of the tape 23 shown in FIG. 4 are integrally hardened as a whole as will be explained later.

Figure 5:
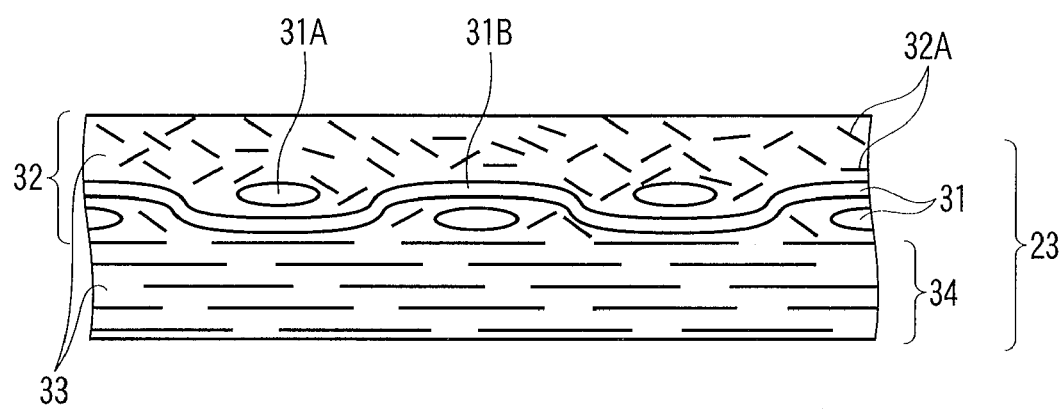
FIG. 5 is a sectional view showing a structure of the mica tape of the embodiment shown in FIG. 4.

As shown in FIG. 5, the high-thermal-conductivity mica tape 23 according to one embodiment of the present invention is formed as one sheet of mica tape in the following manner. That is, a particles layer 32 including the hexagonal crystal boron nitride particles 32A is adhered to an upper surface of a glass cloth 31 which is a cloth woven with glass fibers 31A and 31B by means of epoxy resin adhesive 33, and a mica layer (in this case, hard non-burned composite mica paper 34) made of at least one of peeled-off mica and composite mica is adhered to a lower surface of the glass cloth 31 by the same epoxy resin adhesive 33. Woven cloth made of at least one of inorganic and organic materials may be used instead of the glass cloth 31. As will be explained later, the hexagonal crystal boron nitride particles 32 is particles having a graphitization index of 1.8 or more. When the mica paper layer 34 and the particles layer 32 including the hexagonal crystal boron nitride particles 32A are integrally formed with the glass cloth 31 interposed therebetween by the epoxy resin adhesive such as polymer organic resin adhesive 33, the hexagonal crystal boron nitride particles 32A is oriented in the longitudinal direction of the conductor 21. The resin adhesive 33 is thermosetting resin in this case. However, non-thermosetting resin may also be used. This will be explained below more concretely.

Here, the graphitization index (GI) is defined as a value expressed by the following equation (1) using peak areas formed by X-ray reflection intensity curves obtained respectively from (100) plane, (101) plane and (102) plane of a boron nitride hexagonal crystal in an X-ray diffracted image of hexagonal crystal boron nitride.

$$GI = (S(100) + S(101))/S(102) \quad (1)$$

where S(100), S(101) and S(102) respectively represent peak areas in the (100) plane, (101) plane and (102) plane.

FIG. 5 is a sectional view for explaining an internal structure of the high-thermal-conductivity mica tape of the embodiment. The mica tape 23 is produced in such a manner that Epikote 1001 and Epikote 828 (produced by Yuka Shell Epoxy Inc.) are mixed at 10:90 in weight ratio in both the glass cloth 31 and the hard non-burned composite mica paper 34 having muscovite as a basic material, epoxy resin adhesive 33 diluted by methyl ethyl ketone which is solvent is impregnated, and this solvent is dried and volatilized.

Further, hexagonal crystal boron nitride (graphitization index is 0.9) particles 32A having properties shown in a column of comparative example 1 in FIG. 6 is mixed in the epoxy resin adhesive 33 having the same composition, it is applied to a surface of the glass cloth 31 of the mica tape 23, the solvent is again volatilized and dried to form the particles layer 32, and the high-thermal-conductivity mica tape 23 is obtained. At the time of application, the hexagonal crystal boron nitride particles 32A is oriented along the laminating direction of the mica paper layer 34 and the glass cloth 31.

In one example of detailed specification of the high-thermal-conductivity mica tape 23, as shown in FIG. 7, the mica weight is 160 g/m$^2$; glass cloth weight, 25 g/m$^2$; glass cloth thickness, 0.030 mm; adhesive weight, 25 g/m$^2$; hexagonal crystal boron nitride weight, 55 g/m$^2$; mica tape weight, 265 g/m$^2$; mica tape width, 30 mm; and mica tape thickness, 0.20 mm.

Figure 8:
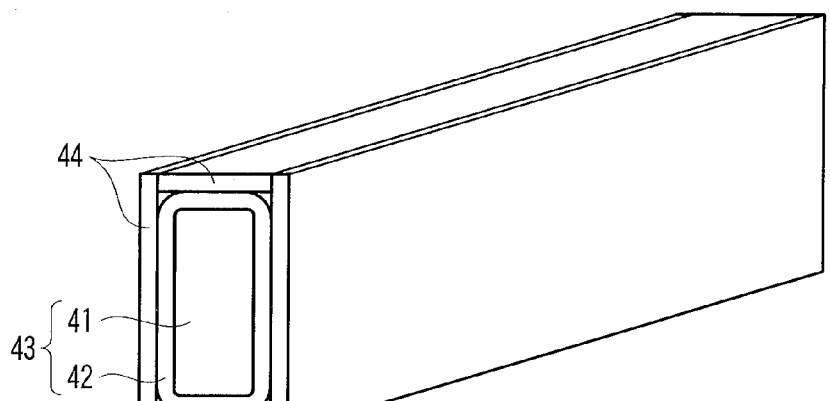
FIG. 8 is a schematic diagram showing a compression forming state under a heated condition for impregnating and hardening the thermosetting resin when a coil insulating layer of an electrical rotating machine of the embodiment shown in FIG. 4 is produced.

The high-thermal-conductivity mica tape 23 obtained in this manner was wound around an aluminum bar 41 (10×50× 1000 mm) imitating a coil conductor of the electrical rotating machine ten times (so that the number of tape layers was 20) in the same manner as shown in FIG. 4 such that the tape 23 was superposed on each other by half the width of the tape, thereby forming an insulating layer 42. Then, epoxy resin composite (TVB2632, produced by Toshiba Chemical Inc.) which is thermosetting polymer organic resin was pressurized and impregnated under vacuum to form an insulation coil 43. The evacuation condition was 13.3 Pa for ten hours, and pressurizing was 0.5 Mpa for 15 hours. Then, stainless plates 44 were butted against upper, lower, left and right surfaces of the insulating layer 42 while the layer 42 was pressurized and heated to harden the insulating layer 42 as shown in FIG. 8 such that the thickness of the insulating layer 42 became 3.5 mm. The surfaces of the stainless plates 44 were previously processed such that the plates 44 could be removed easily after the insulating layer 42 was hardened. The stainless plates 44 were removed to obtain an armature coil 43 of the electrical rotating machine. The heating process was carried out at 150° C. for 20 hours in a hot air circulating type constant temperature bath.

In FIG. 6, the average particles diameter is measured by laser diffractometry, the specific surface area is measured by the BET method, the graphitization index is obtained from the X-ray diffracted image, and the thermal conductivity is measured by ASTM D4351.

In comparative example 2, the graphitization index of the hexagonal crystal boron nitride particles is set as 1.4 which is larger than 0.9 set in the comparative example 1. The thermal conductivity of comparative example 1 was 0.41 W/mK and the thermal conductivity of comparative example 2 was 0.43 W/mK.

The graphitization index of the hexagonal crystal boron nitride particles of example 1 of the invention is 3.0 and the graphitization index of example 2 is 2.0. The thermal conductivity of example 2 is 0.49 W/mK, the thermal conductivity of example 1 is 0.60 W/mK, and thus it can be found that the thermal conductivities of the examples 1 and 2 are higher than those of comparative examples 1 and 2.

A cross section of the insulating layer 42 of the armature coil 43 of the electrical rotating machine having the structure shown in FIG. 8 obtained in this manner was observed concerning the examples 1 to 3 shown in FIG. 6. The hexagonal crystal boron nitride particles in each case was oriented in the longitudinal direction of the mica tape layer 23 shown in FIG. 5.

Figure 9:
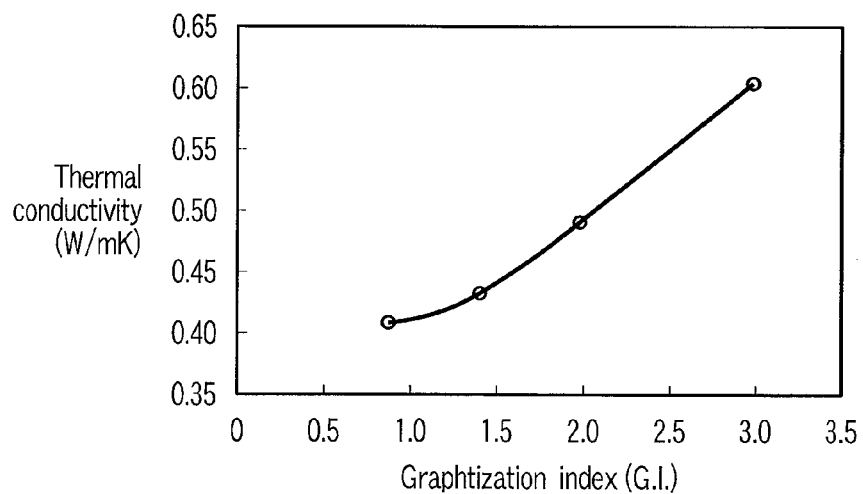
FIG. 9 is a diagram showing characteristics of graphitization index dependence of thermal conductivity in a coil insulator of an electrical rotating machine of the invention.

A plurality of armature coils 43 shown in FIG. 8 were formed while variously changing graphitization indices of the hexagonal crystal boron nitride particles, disks having a diameter of 35 mm and a thickness of 3.5 mm were cut out from the insulating layers 42 at the central portion of the coils 43 in the longitudinal direction, and the thermal conductivity (in accordance with ASTM D4351) was measured by a steady method in a direction perpendicular to the surface of the coil 43, i.e., a thickness direction passing through the mica tape layers, respectively. As a result, as shown in FIG. 9, the thermal conductivity was increased as the graphitization index was higher, and there was a tendency that the thermal conductivity was abruptly increased when the graphitization index was between 1.4 and 2.0 and thus, it was found that the graphitization index was preferably 1.8 or more.

Further, voltage dependence of dielectric loss tangent, breakdown voltage, and electro-mechanical lifetime or voltage endurance of the produced coils were evaluated, and all of comparative examples 1 and 2 and examples 1 and 2 showed the similar results.

Next, comparative example 3 and example 3 shown in FIG. 6 will be explained. In comparative example 3, a graphitization index is 0.9, and some conditions thereof are set as follows. A graphitization index in example 3 is set as 2.0 and some conditions thereof are set as follows.

Figure 10:
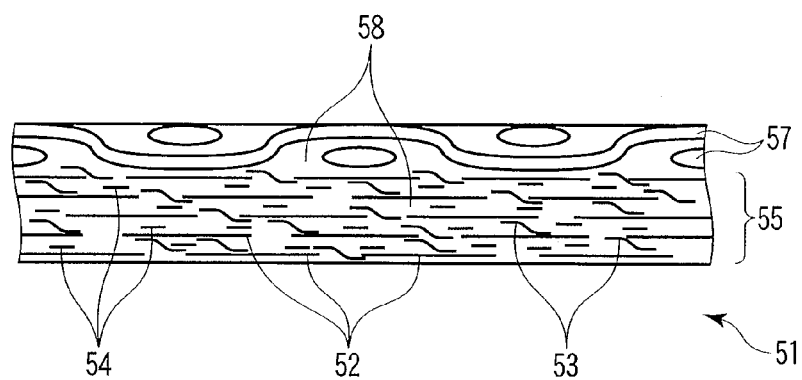
FIG. 10 is a sectional view showing a structure of another embodiment of a high-thermal-conductivity mica tape which is a main constituent member of a coil insulator of the electrical rotating machine of the invention.
Figure 11:
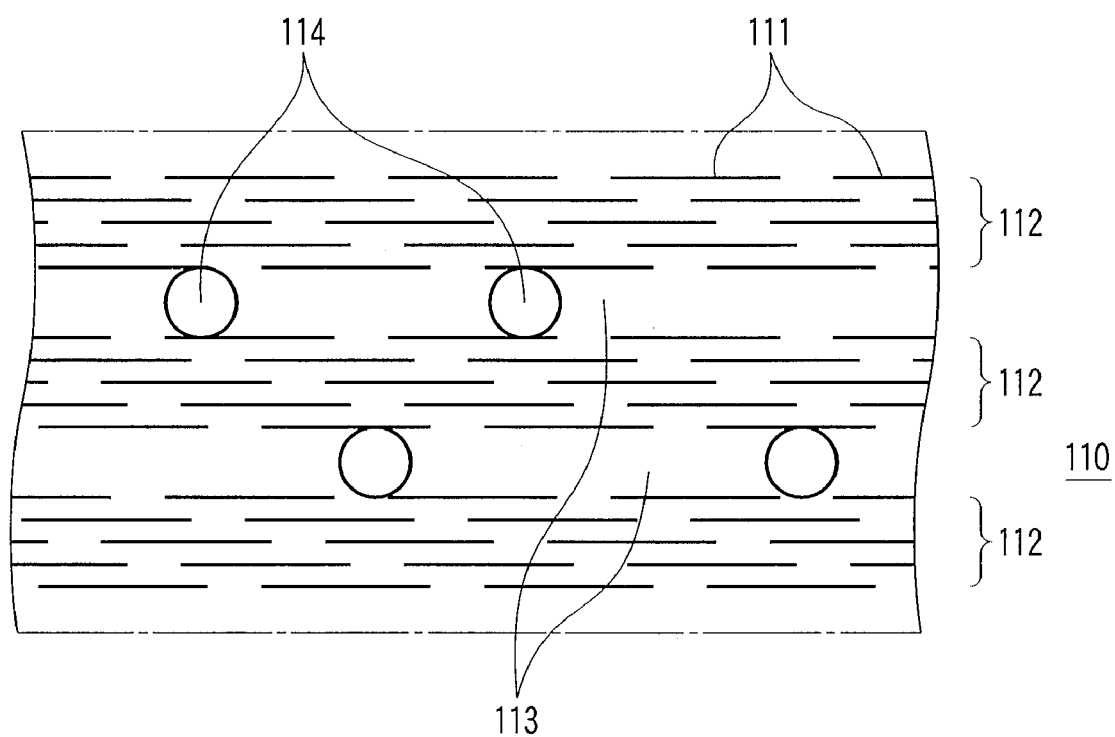
FIG. 11 is a sectional view showing a structure of a high-thermal-conductivity insulator formed by wounding a plurality of high-thermal conductivity mica tape.

As shown in FIG. 10, a high-thermal-conductivity mica tape 51 used here was produced in the following manner. First, 100 parts in weight of burned composite mica 52, 40 parts in weight of aromatic polyamidefibrid (water leakiness of 60° SR) 53 and 20 parts in weight of hexagonal crystal boron nitride 54 described in a column of comparative example 1 in FIG. 6 were mixed to form a dispersion liquid. The dispersion liquid is used to produce a hard burned composite mica paper 55 by using a cylinder-mesh paper machine. Then, Epikote 1001 and Epikote 828 (Yuka Shell Epoxy Inc.) with a weight ratio of 10:90 were diluted by solvent methyl ethyl ketone to form epoxy resin adhesive 58 which is thermosetting polymer organic resin. The resin was then impregnated in the hard burned composite mica paper 55 having a thickness of 0.08 mm and glass cloth (thickness 0.030 mm) 57. Finally, the solvent was dried and volatilized to produce the mica tape 51.

An insulated armature coil of an electrical rotating machine was produced using the high-thermal-conductivity mica tape 51 having a thickness of 0.12 mm and a width of 25 mm obtained in this manner. The coil producing method is the similar manner as that of comparative example 1 except that the mica tape 51 was wound 15 times.

A cross section of the coil insulating layer applied to an armature coil of the electrical rotating machine according to comparative example 3 and example 3 obtained in this manner was observed. As a result, it was found that the hexagonal crystal boron nitride particles was oriented in the same direction as the mica scales in the mica paper 55, i.e., in the longitudinal direction of the mica tape 51.

Sample disks each having a diameter of 35 mm and a thickness of 3.5 mm were cut out from insulating layers of central portions of coils in the longitudinal direction of comparative example 3 and example 3, and thermal conductivity was measured in the thickness direction passing through the surface of the mica tape by a steady method (in accordance with ASTM D4351). As a result, it was found that the thermal conductivity of the insulating layer of comparative example 3 was 0.40 W/mK, the thermal conductivity of the insulating layer of example 3 was 0.47 W/mK and the thermal conductivity of the latter case was higher than the comparative example 3.

According to the above-described embodiments, if the graphitization index of the hexagonal crystal boron nitride particles is 1.8 or more, even if the hexagonal crystal boron nitride particles is oriented along the longitudinal direction of the insulating layer to secure the electric characteristics such as electric insulation, it is possible to further enhance the thermal conductivity in the thickness direction of the mica tape.

The embodiments of the present invention may be modified in the following manners other than the above-described embodiments.

As shown in FIG. 3, for example, a coil insulator used as a main insulator for insulating a bundle of conductors formed of a plurality of insulated wires to form an armature coil provided in a slot of a rotor core or a stator core of an electrical rotating machine may be prepared. That is, a mica tape including a mica layer containing at least one of peeled-off mica (mica flake) and composite mica is prepared. The mica tape and a woven cloth, e.g., glass cloth including at least an inorganic or organic material are adhered by polymer organic resin with each other. At least one of a surface of the mica tape opposed to the woven cloth and an opposed surface of the mica layer may be applied with organic resin containing hexagonal crystal boron nitride particles having graphitization index of 1.8 or higher to form a resin-applied mica tape having a structure as shown in FIG. 10. The mica tape thus formed is then wound around the bundle of conductors 18A. Then, thermosetting polymer organic resin is impregnated in the wound mica tape and hardened as show in FIG. 3.

A mica tape prepared by adhering a composite mica paper in which hexagonal crystal boron nitride particles having a graphitization index of 1.8 or more may be mixed; with a woven cloth, e.g., glass cloth including at least one of inorganic and organic materials, by a polymer organic resin to form an integrated body of the composite mica paper and the woven cloth to form a structure as shown in FIG. 10. The mica tape thus formed is wound around the bundle of conductors and then, a thermosetting polymer organic resin is impregnated in the mica tape and hardened to form the coil insulator.

Further, a mica tape may be prepared by adhering a mica layer including at least one of a peeled-off mica and a composite mica and a woven- or unwoven cloth, e.g., glass cloth including at least one of inorganic and organic materials by a semi-hardened thermosetting polymer organic resin as an integrated form. Organic resin including hexagonal crystal boron nitride particles having a graphitization index of 1.8 or more may be applied to the mica tape on at least one of a surface opposed to the cloth and a surface opposed to the mica layer as shown in FIG. 5, and the mica tape is wound around the bundle of conductors and is heated and hardened.

Further, a mica tape may be prepared by adhering a composite mica layer in which hexagonal crystal boron nitride particles having a graphitization index of 1.8 or more is mixed and a woven- or unwoven cloth, e.g., glass cloth including at least one of inorganic and organic materials by a semi-hardened thermosetting polymer organic resin, to form a structure as shown in FIG. 10. The mica tape is wound around the bundle of conductors, and is formed under pressure, heated and hardened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil insulator of an electrical rotating machine used as a main insulator for insulating a bundle of conductors formed of a plurality of insulated wires to form an armature coil provided in a slot of a rotor core or a stator core of an electrical rotating machine,
   wherein the coil insulator comprises:
      a mica layer including at least one of a peeled-off mica and a composite mica;
      a woven- or unwoven cloth formed of at least one of inorganic and organic materials;
      hexagonal crystal boron nitride particles having a graphitization index of 1.8 or higher; and
      thermosetting polymer organic resin for forming an integrated configuration of the mica layer and the hexagonal crystal boron nitride particles, and
   wherein the hexagonal crystal boron nitride particles is oriented in a longitudinal direction of the armature coil.

2. The coil insulator of an electrical rotating machine according to claim 1,
   wherein the graphitization index (GI) is a value expressed by following equation using peak areas of (100) plane, (101) plane and (102) plane of boron nitride in an X-ray diffracted image:

$$GI=(S(100)+S(101))/S(102)$$

where S(100), S(101) and S(102) represent the peak areas of the (100) plane, (101) plane and (102) plane, respectively.

3. A coil insulator of an electrical rotating machine used as a main insulator for insulating a bundle of conductors formed of a plurality of insulated wires to form an armature coil provided in a slot of a rotor core or a stator core of an electrical rotating machine, wherein the coil insulator comprises:
      a resin-applied mica tape including a mica layer containing at least one of a peeled-off mica and a composite mica;
      a woven- or unwoven cloth formed of at least one of inorganic and organic materials; polymer organic resin which adheres the mica layer and the cloth to each other to form the resin-applied mica tape; and
      an organic resin layer containing hexagonal crystal boron nitride particles having a graphitization index of 1.8 or more to at least one of a surface of the resin-applied mica tape opposed to the cloth and an opposed surface of the mica layer, and
   wherein the resin-applied mica tape is wound around the bundle of the conductors, and thermosetting polymer organic resin is impregnated in the mica tape, shaped and hardened, and
   wherein the hexagonal crystal boron nitride particles are oriented in a longitudinal direction of the armature coil.

4. The coil insulator of an electrical rotating machine according to claim 3,
   wherein the graphitization index (GI) is a value expressed by following equation using peak areas of (100) plane, (101) plane and (102) plane of boron nitride in an X-ray diffracted image:

$$GI=(S(100)+S(101))/S(102)$$

where S(100), S(101) and S(102) represent the peak areas of the (100) plane, (101) plane and (102) plane, respectively.

5. A coil insulator of an electrical rotating machine used as a main insulator for insulating a bundle of conductors formed of a plurality of insulated wires to form an armature coil provided in a slot of a rotor core or a stator core of an electrical rotating machine,
   wherein the coil insulator comprises:
      a mica tape configured of a composite mica paper in which hexagonal crystal boron nitride particles having a graphitization index of 1.8 or more is mixed with mica foil;
      a woven- or unwoven cloth made of at least one of inorganic and organic materials; and
      a polymer organic resin to adhere the composite mica paper and the cloth to each other, and
   wherein the mica tape is wound around the bundle of conductors, impregnated with thermosetting polymer organic resin and then, hardened, and
   wherein the hexagonal crystal boron nitride particles are oriented in a longitudinal direction of the armature coil.

6. The coil insulator of an electrical rotating machine according to claim 5,
   wherein the graphitization index (GI) is a value expressed by following equation using peak areas of (100) plane, (101) plane and (102) plane of boron nitride in an X-ray diffracted image:

$$GI=(S(100)+S(101))/S(102)$$

where S(100), S(101) and S(102) represent the peak areas of the (100) plane, (101) plane and (102) plane, respectively.

7. A coil insulator of an electrical rotating machine used as a main insulator for insulating a bundle of conductors formed of a plurality of insulated wires to form an armature coil provided in a slot of a rotor core or a stator core of an electrical rotating machine, wherein the coil insulator comprises:

a mica layer including at least one of a peeled-off mica and a composite mica;

a woven- or unwoven cloth formed of at least one of inorganic and organic materials; and thermosetting semi-hardened polymer organic resin which adheres the mica layer and the cloth to each other; and wherein the mica tape coated on at least one of a surface opposed to the cloth and a surface opposed to the mica layer with organic resin including hexagonal crystal boron nitride particles having at least a graphitization index of 1.8 or more is wound around the bundle of conductors, shaped under pressure, and hardened under heated condition, and wherein the hexagonal crystal boron nitride particles are oriented in a longitudinal direction of the armature coil.

8. The coil insulator of an electrical rotating machine according to claim 7, wherein the graphitization index (GI) is a value expressed by following equation using peak areas of (100) plane, (101) plane and (102) plane of boron nitride in an X-ray diffracted image:

$$GI=(S(100)+S(101))/S(102)$$

where S(100), S(101) and S(102) represent the peak areas of the (100) plane, (101) plane and (102) plane, respectively.

9. A coil insulator of an electrical rotating machine used as a main insulator for insulating a bundle of conductors formed of a plurality of insulated wires to form an armature coil provided in a slot of a rotor core or a stator core of an electrical rotating machine, wherein the coil insulator comprises:

a mica tape including a composite mica layer in which hexagonal crystal boron nitride particles having at least a graphitization index of 1.8 or more is mixed;

a woven- or unwoven cloth formed of at least one of inorganic and organic materials; and thermosetting semi-hardened polymer organic resin which adheres the composite mica layer and the cloth to each other; and wherein the mica tape is wound around the bundle of conductors, shaped under pressure, and hardened under heated condition, and wherein the hexagonal crystal boron nitride particles are oriented in a longitudinal direction of the armature coil.

10. The coil insulator of an electrical rotating machine according to claim 9, wherein the graphitization index (GI) is a value expressed by following equation using peak areas of (100) plane, (101) plane and (102) plane of boron nitride in an X-ray diffracted image:

$$GI=(S(100)+S(101))/S(102)$$

where S(100), S(101) and S(102) represent the peak areas of the (100) plane, (101) plane and (102) plane, respectively.

11. An armature coil of an electrical rotating machine comprising:

a coil conductor; and a coil insulator coated on the coil conductor, wherein the coil insulator has the structure described in any one of claims 1 to 10.

12. An electrical rotating machine comprising:

a rotor; and a stator having an armature coil opposed to the rotor, wherein the armature coil has the structure described in claim 11.

* * * * *